US009313255B2

(12) United States Patent
Klemets et al.

(10) Patent No.: US 9,313,255 B2
(45) Date of Patent: Apr. 12, 2016

(54) DIRECTING A PLAYBACK DEVICE TO PLAY A MEDIA ITEM SELECTED BY A CONTROLLER FROM A MEDIA SERVER

(71) Applicant: Microsoft Technology Licensing, LLC, Redmond, WA (US)

(72) Inventors: Anders Edgar Klemets, Redmond, WA (US); Steven Wilssens, Bothell, WA (US); Gabriel Frost, Sammamish, WA (US); Shafiq Rahman, Redmond, WA (US); Matthew Andrews, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 13/918,379

(22) Filed: Jun. 14, 2013

(65) Prior Publication Data

US 2014/0372565 A1 Dec. 18, 2014

(51) Int. Cl.
*G06F 15/16* (2006.01)
*H04L 29/08* (2006.01)
*H04N 21/41* (2011.01)
*H04N 21/422* (2011.01)
(Continued)

(52) U.S. Cl.
CPC ............ *H04L 67/02* (2013.01); *H04N 21/4122* (2013.01); *H04N 21/4126* (2013.01); *H04N 21/42204* (2013.01); *H04N 21/43615* (2013.01); *H04N 21/482* (2013.01)

(58) Field of Classification Search
CPC ... H04L 67/02; H04L 21/482; H04L 21/4126; H04L 21/43615; H04L 21/4122; H04N 21/482; H04N 21/4126; H04N 21/43615; H04N 21/4122
See application file for complete search history.

(56) References Cited

U.S. PATENT DOCUMENTS

| | | | |
|---|---|---|---|
| 7,483,958 B1 * | 1/2009 | Elabbady et al. | 709/217 |
| 7,848,351 B2 | 12/2010 | Kim et al. | |
| 8,332,897 B1 | 12/2012 | Rowe | |
| 8,429,516 B1 * | 4/2013 | Riggs et al. | 715/201 |

(Continued)

FOREIGN PATENT DOCUMENTS

WO 2012/057661 A1 5/2012

OTHER PUBLICATIONS

Chakrobartty, et al., "Support for DLNA Media Devices in Windows Embedded Compact 7", Retrieved at <<http://download.microsoft.com/download/2/4/A/24A36661-A629-4CE6-A615-6B2910A1367A/Support%20for%20DLNA%20Media%20Devices%20in%20Windows%20Embedded%20Compact%207.pdf>>, Jan. 2012, pp. 14.

(Continued)

*Primary Examiner* — Krisna Lim
(74) *Attorney, Agent, or Firm* — Sunah Lee; Kate Drakos; Micky Minhas (57) ABSTRACT

A remote media server provides a resource identifier to a digital media controller. A digital media controller passes this resource identifier to a digital media renderer. The digital media renderer launches an application that processes the resource identifier to access the remote media server and play back the media. Playback is responsive to controls from the digital media controller. The digital media renderer can play back media identified by the digital media controller, but that is encoded and protected in a manner specific to the digital media renderer. The digital media controller can shut down or become dormant to save battery power without affecting playback by the digital media renderer. By providing the information about available applications from the digital media renderer to the digital media controller, the digital media controller can reliably send resource identifiers for which applications are available the digital media renderer.

20 Claims, 7 Drawing Sheets

(51) Int. Cl.
*H04N 21/436* (2011.01)
*H04N 21/482* (2011.01)

(56) References Cited

U.S. PATENT DOCUMENTS

| | | | |
|---|---|---|---|
| 2004/0258059 A1* | 12/2004 | Frank et al. | 370/389 |
| 2008/0147214 A1* | 6/2008 | Lee et al. | 700/94 |
| 2009/0028072 A1* | 1/2009 | Liang | 370/271 |
| 2010/0095322 A1 | 4/2010 | Gran et al. | |
| 2010/0332565 A1* | 12/2010 | Al-Shaykh et al. | 707/912 |
| 2011/0289199 A1 | 11/2011 | Kuo et al. | |
| 2012/0158984 A1 | 6/2012 | Maitre et al. | |
| 2012/0159338 A1 | 6/2012 | Mountanos et al. | |
| 2012/0210205 A1 | 8/2012 | Sherwood et al. | |
| 2013/0027617 A1 | 1/2013 | Choi et al. | |

OTHER PUBLICATIONS

"Pixel Media Controller (Pixel DMC)", Retrieved at <<https://play.google.com/store/apps/details?id=com.cmc.dmc&hl=en>>, Retrieved date: Apr. 11, 2013, pp. 3.

"DLNA Extention", Retrieved at <<http://developer.oesf.biz/em/developer/dev_guide/DLNA.html>>, Retrieved date: Apr. 11, 2013, pp. 6.

"Providing Next Generation Software for Audio & Video Connected Consumer Electronic Devices", Retrieved at <<http://www.awox.com/pdf/us/AwoX_middleware.pdf>>, Retrieved date: Apr. 11, 2013, pp. 20.

"Helium—a M-DMC for your N9", Retrieved at <<http://jensge.org/helium-a-m-dmc-for-your-n9/>>, Jun. 7, 2012, pp. 13.

Heredia, Edwin, "DLNA Device Implementation", Retrieved at <<http://download.microsoft.com/download/f/0/5/f05a42ce-575b-4c60-82d6-208d3754b2d6/DLNA_Part_2_RS08.pptx>>, Retrieved date: Apr. 11, 2013, pp. 21.

"Discovery and Launch Protocol Specification", Retrieved at <<http://www.dial-multiscreen.org/dial-protocol-specification/DIAL-2ndScreenProtocol-1.6.4.pdf?attredirects=0&d=1>>, Retrieved date: Apr. 21, 2013, pp. 16.

PCT International Search Report and Written Opinion in International Application PCT/US2013/061058, mailed Feb. 25, 2014, 9 pgs.

* cited by examiner

DIRECTING A PLAYBACK DEVICE TO PLAY A MEDIA ITEM SELECTED BY A CONTROLLER FROM A MEDIA SERVER

BACKGROUND

In recent years, new consumer electronics devices have been introduced that can connect to local area computer networks, including home networks. Examples of such devices include printers, DVD players and personal video recorders. A technology called Universal Plug and Play (UPnP) has been developed to provide a common language for such devices to communicate over such local area computer networks.

UPnP defines a category of devices called media servers, and another category called media renderers, and a concept called a control point. A control point is an entity which can find UPnP devices and control them. A control point that controls a media renderer is referred to as a digital media controller (DMC).

A common use of UPnP devices is to have a media server that transfers multimedia content (e.g., a digital representation of a movie) to a media renderer device, with the help of a digital media controller. If the media server, media renderer and the digital media controller are three separate devices, then the digital media controller orchestrates the connection between the media renderer and the media server.

In a possible scenario, the media renderer is a networked television, the media server is a desktop personal computer, and the digital media controller is a portable personal computer such as a notebook computer or a mobile phone, all interconnected on a local area network, such as in a home network. The digital media controller discovers the media server and downloads a catalog of movies from the media server. The digital media controller then instructs the media renderer to initiate a streaming transfer of one the movies from the media server to the media renderer for display on the television screen.

In another possible scenario, the device that acts as a digital media controller also hosts a server that streams media data to the digital media renderer. For example, the digital media controller can be an application running on a tablet computer which receives media data from another application that acts as a digital media server, and the digital media renderer can be a television or a gaming console connected to a television.

There are several limitations with existing implementations of UPnP and similar networked systems when the digital media controller is streaming media to the digital media renderer.

First, the digital media controller cannot enter into a dormant state, commonly called a "sleep" state or "hibernating" state in which activity of the device is reduced so as to conserve power. Transitioning to such a state can interrupt transfer of the media from the digital media controller in the event the digital media controller also acts as a media server. However, not transitioning to such a state can result in the digital media controller running out of battery power.

Second, if the digital media controller is receiving media from another service not on the local area network, such as an online store or other remote media server connected to a computer network, such as the internet, the media may be encoded by that service to be optimized for the digital media controller. For example, if the digital media controller is a small portable device, and the digital media renderer is a high definition television, the digital media controller may receive media with a small spatial resolution and not high definition.

Third, if the digital media controller is receiving media from another service not on the local area network, such as an online store or other remote media server connected to a computer network, such as the internet, the media may be protected by digital rights management technology that allows only the digital media controller to access the media.

SUMMARY

This Summary introduces selected concepts in simplified form that are further described below in the Detailed Description. This Summary is intended neither to identify key or essential features of the claimed subject matter, nor to limit the scope of the claimed subject matter.

A remote media server provides a resource identifier to a digital media controller. A digital media controller passes this resource identifier to a digital media renderer. The digital media renderer launches an application that processes the resource identifier to access the remote media server and play back the media. Such playback is then responsive to controls from the digital media controller. In such a configuration, the digital media renderer can play back media identified by the digital media controller, but that is encoded and protected in a manner specific to the digital media renderer instead of the digital medial controller. Also, the digital media controller can shut down or become dormant to save battery power without affecting playback by the digital media renderer. By providing the information about available applications from the digital media renderer to the digital media controller, the digital media controller can reliably send resource identifiers for which applications are available the digital media renderer.

Accordingly, in one aspect, a digital media controller requests data from a digital media renderer about applications installed on the digital media renderer. The digital media controller determines whether the applications can playback a media item specified by a resource identifier. If the digital media renderer can playback the media item, the digital media controller sends the resource identifier to the digital media renderer. The digital media controller can control playback of the media item by the digital media renderer, which accesses the digital media item from the remote media server.

In another aspect, a remote media server provides information about media items, including a resource identifier for a media item, to a digital media controller. The resource identifier enables a digital media renderer to access another version of the media item.

In another aspect, a digital media controller receives information about media items from a remote media server. This information includes a resource identifier for a media item. The resource identifier enables a digital media renderer to access a version of the media item from a remote media server.

In another aspect, a digital media renderer provides information about available applications that support playback of a media item from a remote media server given a resource identifier from a digital media controller. Such information can be collected by an operating system of the digital media renderer when the applications are installed.

In another aspect, the digital media renderer plays back a media item from a remote media server in response to a resource identifier provided by a digital media controller. The playback is controlled through playback commands from the digital media controller.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
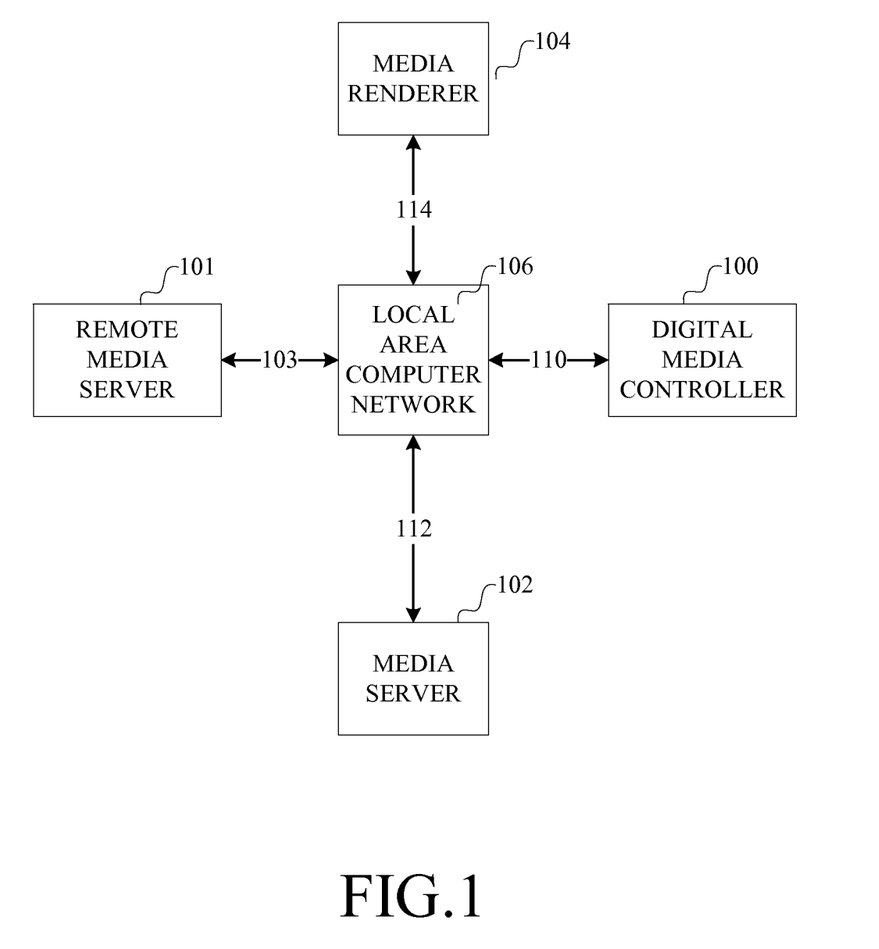
FIG. 1 is a block diagram of an example system that interconnects a media server with a digital media controller and digital media renderer.

The following section provides an example operating environment. Referring to FIG. 1, a digital media controller 100, a media server 102 and a media renderer 104 are connected to each other through a local area computer network 106. The digital media controller 100 is connected through a first network connection 110. The media server 102 is connected through a second network connection 112. The media renderer 104 is connected through a third network connection 114.

In an example configuration, the media server 102 can be a desktop computer that provides media data such as digital video data files to the digital media controller. The second network connection 112 can be, for example, a wired Ethernet connection that connects to the local area computer network 106, or a wireless connection. The local area computer network 106, as an example, can be implemented using a router, which provides both wired and wireless connections among the digital media controller 100, media server 102 and media renderer 104.

The media renderer 104, in this example, is a television that plays back received digital video data files, for which the third network connection 114 to the computer network is a wireless connection.

The digital media controller 100, in this example, is a mobile computing device, such as a tablet computer, for which the first network connection 110 to the computer network is a wireless connection.

In this example, communication among the various devices can be over a local area network using the UPnP protocol. It should be understood, however, that other protocols can be used.

While the foregoing describes an example practical configuration, such configurations can change in any given installation. For example, a user may decide to connect the digital media controller 100 to the local area computer network 106 through a wired connection. Also, the digital media controller 100 is implemented so as to anticipate several possible configurations. For example, any of the first, second, or third network connections (110, 112, 114) can be wired or wireless. If wired, the connection can use IPv6, IPv4 or other protocol. Also, if wireless, the connection can be Infrastructure-Wi-Fi, Wi-Fi-Direct, or other protocol. While the configuration shown assumes that the local area computer network 106 is implemented using a single router with wired and wireless connectivity, the computer network 106 can be arbitrarily complex.

In such a system, the device that acts as a digital media controller also can host a server that streams media data to the digital media renderer. For example, the digital media controller can be an application running on a tablet computer that streams media data to the digital media renderer. The digital media renderer can be any of a variety of devices, including, but not limited to: a television, a gaming console connected to a television, an audio receiver, audio speakers, or another computer.

The digital media controller receives the media data over a wide area computer network 103, such as the internet, from a remote media server 101, which is not part of the UPnP controlled home network. The remote media server can be, for example, an online store or other remote media server connected to a wide area computer network, such as the internet. The local area computer network 106 allows the digital media controller and the digital media renderer to access the remote media server by connecting to the wide area computer network on which the remote media server resides. The media may be encoded by the remote media server to be optimized for the device that is receiving the media data. The media also may be protected by that service using digital rights management technology limiting access to the media to the device that is receiving the media data. In practice there are a large number of remote media servers, as any resource on the internet can be identified as a remote media server.

In this context, the digital media controller and the digital media renderer are configured so as to allow the digital media controller to identify media on the remote media server, and then instruct the digital media renderer to access that media directly from the remote media server without further intervention by the digital media controller, but still allowing playback to be controlled through commands from the digital media controller. To achieve this, the digital media renderer provides information to the digital media controller about the available applications that can play back media data. The digital media controller provides the digital media renderer a resource identifier for use by one of the applications. The application accesses the media data directly from the resource using the resource identifier; however, the digital media renderer still provides control commands from the digital media controller to the application.

Given this context, an example implementation will be described in more detail in connection with FIGS. 2-6.

Figure 2:
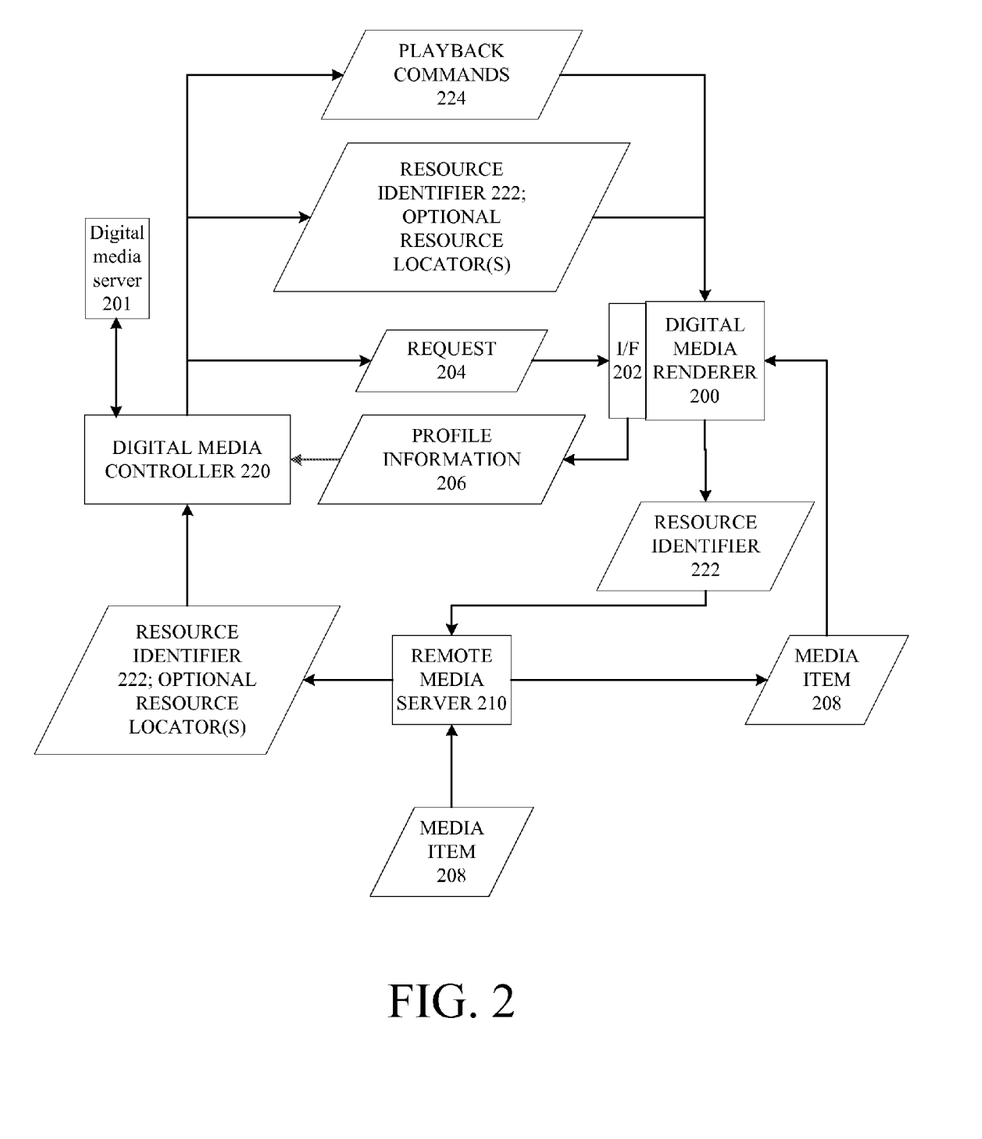
FIG. 2 is a data flow diagram illustrating an example implementation of such a system.

In FIG. 2, a more detailed block diagram of such a system will now be described. A digital media renderer 200 implements an interface 202 through which the digital media controller 220 can issue a request 204 for information about applications available on the digital media renderer. In response to such a request, the digital media renderer provides profile information 206 indicative of the applications available for playing media data.

When the digital media controller identifies a media item 208 on a remote media server 210, the digital media controller receives a resource identifier 222 for the media item. The digital media controller also can receive a resource locator from the remote media server that identifies a version of the media item to be consumed by the digital media controller, and which can be stored on a local digital media server 201. The remote media server also can optionally provide, to the digital media controller, one or more resource locators for streaming the media item. The digital media controller 220 provides the resource identifier 222 to the digital media renderer 200; optionally, resource locator(s) also can be provided to the digital media renderer 200. Those resource locators can point to resources on the remote media server 210 or the local digital media server 201. The digital media controller may specify the application on the digital media renderer that will use the resource identifier, or the digital media renderer may select the application, or the resource identifier itself can specify an application to play the resource. The digital media renderer accesses the media item 208 directly from the remote media server 210, e.g., over the internet, instead of from the local digital media server 201, using the resource identifier 222. The digital media renderer 200 then plays back the media item in response to playback commands 224 from the digital media controller. It is possible for the digital media renderer also to ignore the resource identifier and use one of the resource locators to stream a media item from the source specified by the resource locator.

The digital media renderer can be configured to provide the profile information in a number of ways. In one implementation, when an application is installed on the digital media renderer, the application provides information to an operating system on the digital media renderer indicating its capability to receive a resource identifier to play media under the control of the digital media controller. The operating system of the digital media renderer then provides such information for all applications in response to a query from the digital media controller. In one implementation, the "GetProtocolInfo" command of UPnP connection manager service can be used to pass this information from the digital media renderer to the digital media controller.

One specific example of such protocol information is the following. In this implementation the protocol information is defined using a markup language, and a markup element (below, e.g., "<sink> . . . </sink>") defines the list of available applications:

```
<ProtocolInfo>
<sink>
microsoft.com:*:application/vnd.ms-playtoapp="ms-playtoapp-
xboxvideo":*,
microsoft.com:*:application/vnd.ms-playtoapp="application2":*
</sink>
</ProtocolInfo>
```

In such an implementation where applications on the digital media renderer provide its operating system with information, when a digital media controller provides the digital media renderer with a resource identifier, the digital media renderer can readily identify the application for which the resource identifier is intended and run that application.

An example implementation of the resource identifier is a uniform resource identifier (URI) that identifies a media item by identifying a service to be used to play the identified media item, and not a specific location for a specific encoding of the media item. This resource identifier can be embedded in a media item or conveyed separately from the media item. The digital media controller uses the URI and information about available applications on the digital media renderer to determine which URI to send to the digital media renderer.

The resource identifier is supplied from the remote media server from which the media item is retrieved from the digital media renderer. For example, the remote media server can provide the digital media controller with a web page that references a video. The reference to the video can include the resource identifier for the video.

As a specific example, the web page can include a markup element that references a video. The markup element specifies a resource identifier to be sent by the digital media controller to a digital media renderer. The markup element also can specify one or more resource locators to be accessed to playback video on the current device, e.g., on the digital media controller. For example, consider the following markup element:

<video src="http://webserver/video.mp4" x-ms-playtoPreferredUri="ms-playtoapp-xboxvideo://mediaitem_123">

In the foregoing example, a markup element defines video (e.g., "<video . . . />") in a web page. One attribute (e.g., "src='{filename}'") can be a resource locator identifying a source file to be accessed to playback video on the current device such as the digital media controller. Another attribute can be a resource identifier (e.g., "x-ms-playToPreferredURI={resource identifier}") that specifies the resource identifier that can be passed to another device such as the digital media renderer. There can be multiple resource locators; resource locators can be omitted.

Figure 3:
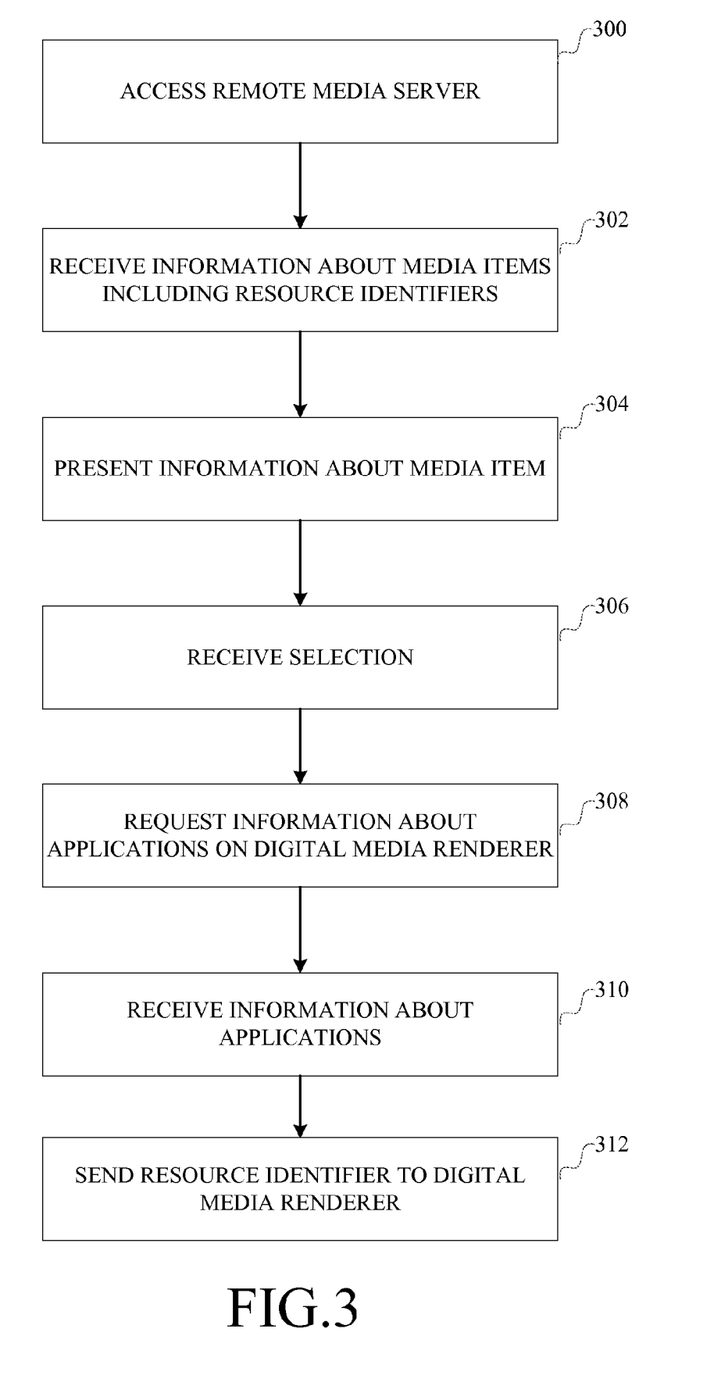
FIG. 3 is a flow chart an example implementation of a digital media controller.

Referring now to FIG. 3, an example operation of a digital media controller will now be described.

The digital media controller accesses 300 a remote media server, from which it receives 302 information about one or more media items, including but not limited to a resource identifier for a media item. An application on the digital media controller, such as a browser application or a media player application, identifies the resource identifier and presents 304 information about the media item to the user. The digital media controller then receives 306 an indication of a selected media item. For example, a user viewing a web page in a browser application can select an item to be played back.

The digital media controller requests 308 information about available applications from the digital media renderer. The digital media renderer responds, and the digital media controller receives 310 the information. This information can be used in a variety of ways. For example, the digital media controller can create a graphical user interface through which a user can select an application on the digital media renderer through which to playback a selected media item. The resource identifier for the selected media item is then sent 312 to the digital media renderer.

The steps in FIG. 3 can be performed in different orders, as the steps to identify and select a media item, and the steps to identify and select an application on the digital media renderer, can be done separately, with the results of one set of steps informing the subsequent steps.

In one implementation, the operating system of the digital media controller provides an application programming interface through which information, such as a resource identifier, can be shared from one application to another. In such an implementation, the operating system can show any application from a digital media renderer to which the digital media controller is connected as a possible target for sharing data.

Figure 4:
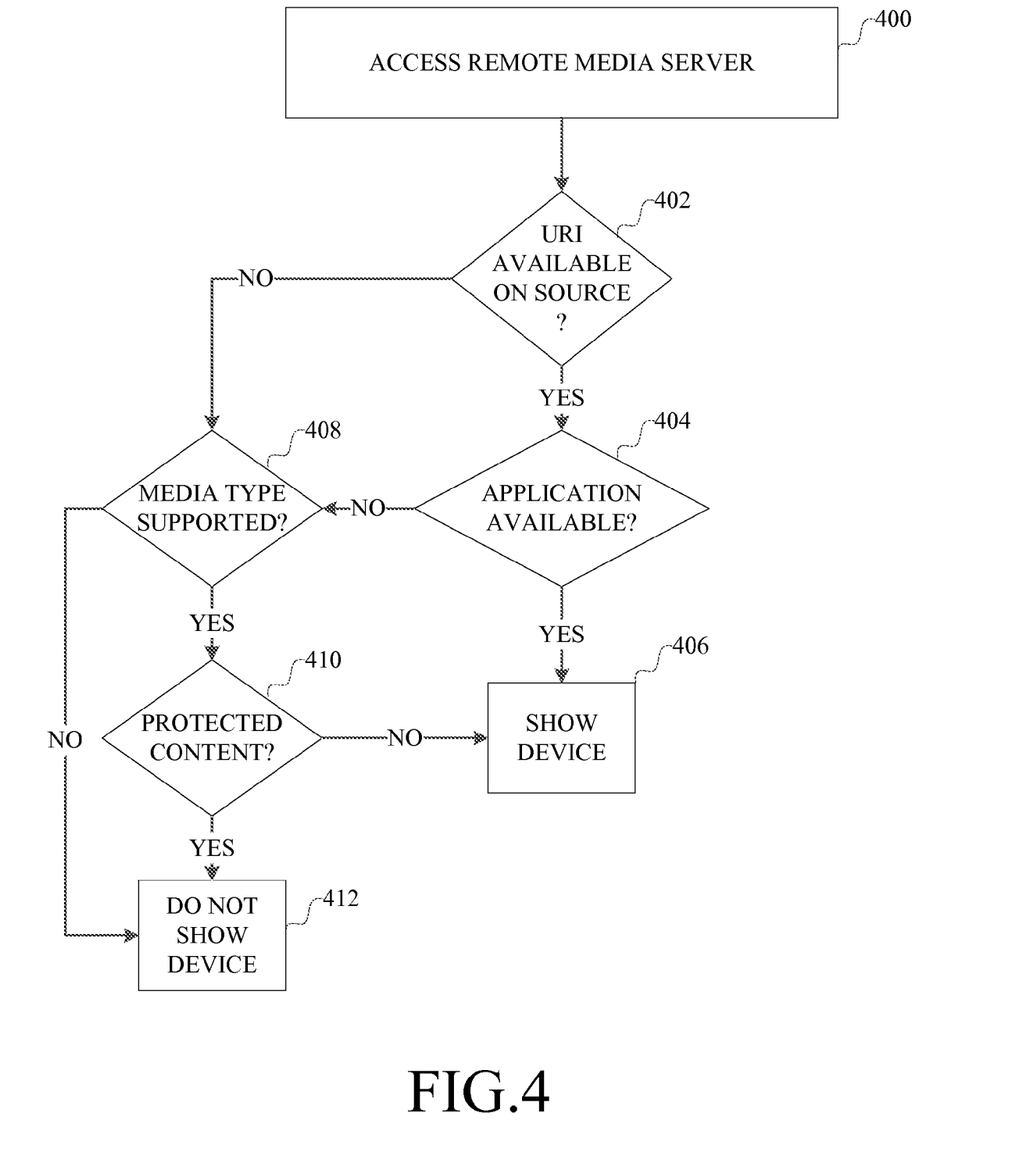
FIG. 4 is a flow chart an example implementation of a digital media controller.

FIG. 4 is a flowchart describing an example implementation of how the digital media controller identifies and presents to the user available applications to which a resource identifier can be sent.

First, an indicator of the resource identifier is received 400. It is then determined 402, whether the content referenced by the resource identifier is available on the source. If the content is available on the source, and if the device has an application for accessing that source, as determined at 404, for example by examining the protocol information described above, then the device can be shown 406 as available. For example, the source can be a movie service that has its own proprietary player application. If the protocol information indicates this player application is installed on the digital media renderer, then the digital media renderer can be shown as an available device.

If the device does not have an application for accessing the source, as determined at 404, or if the content is not available from that source, as determined at 402, then it is determined, at 408, whether the device otherwise supports the media type. If the media type is supported, it is then determined 410 whether the media is protected. If the media is not protected, then the device also can be shown 406 as available. Thus, as an example, if the player application for a service is not installed, but the media provided by the service is otherwise supported on the device, and the media is not protected, then the media can be played on the device, and the device can be shown as an available device.

Otherwise, if the digital media renderer does not support the media type, as determined at 408, or if the content is protected as determined at 410 (after it having already been determined that an application is not available to access the protected content), then the digital media renderer is not shown 412 as an available device for playing this media item.

It should be understood that the sequence of steps shown in FIG. 4 is merely one implementations, and that other implementations are possible following other sequences of steps. Any sequence of steps which can ultimately identify a device as being available to access a media item can be used, and involves checking, in any order, whether the digital media renderer has either an application that allows access to protected content from the source, or an application that supports the media type of unprotected content, and that the content ultimately is available from the remote media server.

In the foregoing implementation, the requested media content on the remote media server can be referenced by a conventional resource locator, such as a uniform resource locator (URL) as commonly used on the internet, and played back by a conventional browser application or other application that can access unprotected content. After first checking whether the requested content is unprotected, the digital media controller can determine whether the digital media renderer can handle protected content referenced by a resource identifier.

Figure 5:
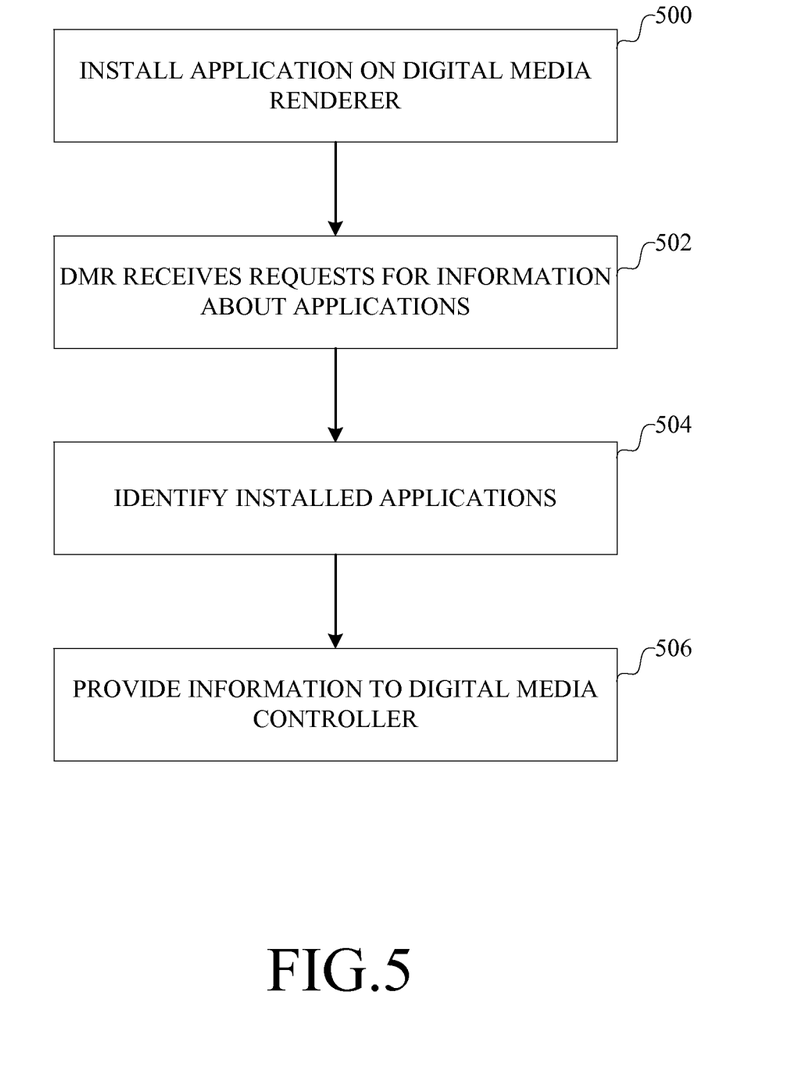
FIG. 5 is a flow chart an example implementation of a digital media renderer.
Figure 6:
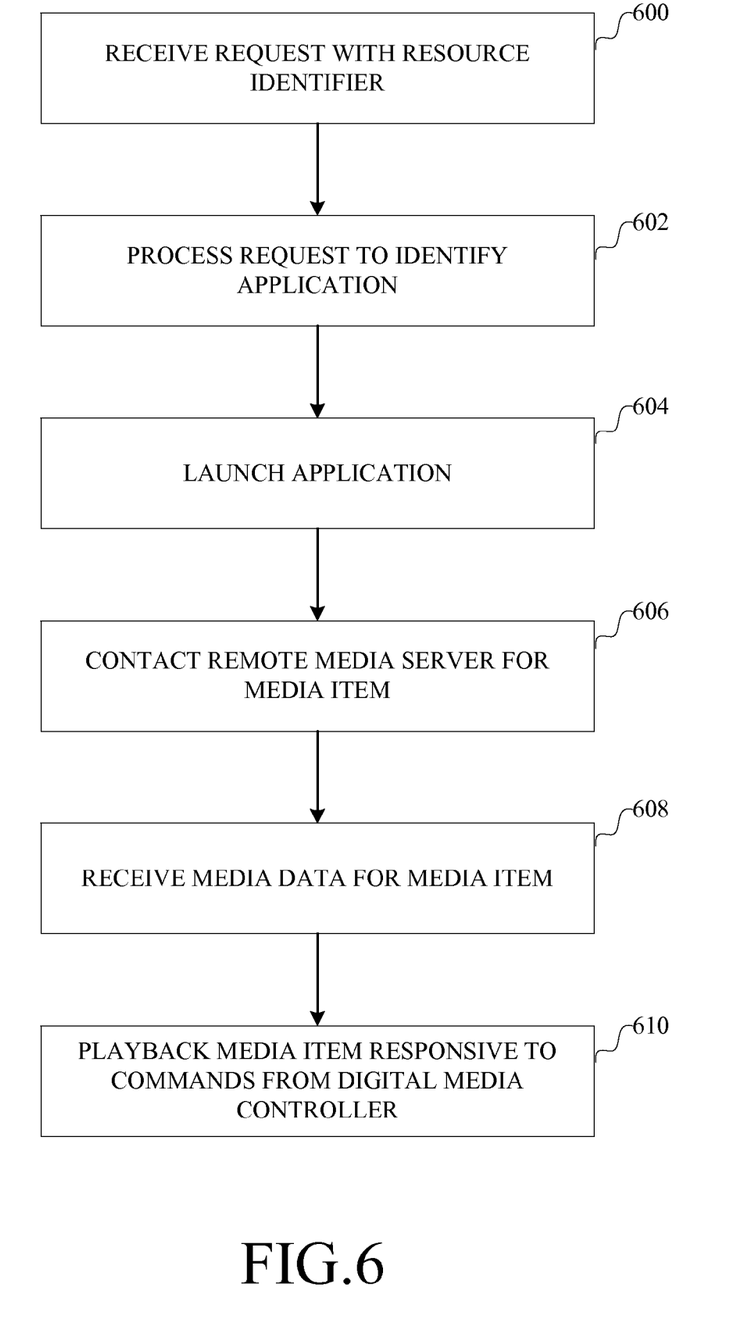
FIG. 6 is a flow chart an example implementation of a digital media renderer.

Referring now to FIGS. 5-6, flow charts of an example implementation of operation of a digital media renderer will now be described. FIG. 5 describes how a digital media controller is informed of the capabilities of the digital media renderer. FIG. 6 describes how a digital media renderer plays back media, identified by a resource identifier, from a remote media server yet under control of the digital media controller.

Thus, in FIG. 5, an application is installed 500 on the digital media renderer. After installation the digital media renderer receives 502 requests, from devices such as digital media controllers, for information describing available applications. The digital media renderer identifies 504 the various applications and provides 506 the protocol information to the requesting device.

When a digital media controller directs a digital media renderer to play back media, the digital media renderer receives 600 a request including a resource identifier. The digital media renderer processes 602 the request to identify an application to play the media. The digital media renderer launches 604 the application, providing the application with the resource identifier. The application uses the resource identifier to contact 606 a remote media server that provides the media item, and receives 608 the media data from that remote media server. The playback of the media is then responsive 610 to commands, such as play, stop, pause, rewind, fast forward and the like from the digital media controller.

As can be seen from the foregoing, a remote media server provides media data specified by a resource identifier. A digital media controller passes this resource identifier to the digital media renderer. The digital media renderer launches the application that processes the resource identifier to access the remote media server and play back the media. Such playback is then responsive to controls from the digital media controller. In such a configuration, the digital media renderer can play back media identified by the digital media controller, but that is encoded and protected in a manner specific to the digital media renderer instead of the digital medial controller. Also, the digital media controller can shut down or become dormant to save battery power without affecting playback by the digital media renderer. By providing the information about available applications from the digital media renderer to the digital media controller, the digital media controller can reliably send resource identifiers that can be used by the digital media renderer.

It should be understood that the foregoing description is not limited to UPnP and similar standards-implementing arrangements. More generally speaking, a first device receives a resource identifier for a media item from a remote media server. The first device provides that resource identifier to a second device which can play the media item. The second device in turn accesses the remote media server directly to access the media data for the media item, and then plays back the media item under the control of the first device.

As an example use case, a user can access a service over the internet using a tablet computer to identify a media item, such as a movie. The service provides a resource identifier for the movie to the tablet computer. The user can then use the table computer to direct a television to playback the movie directly from the service. The tablet computer can communicate with the television to determine which applications are available to play back a media item from the service. The tablet computer provides the resource identifier to the television. An application running on the television connects with the service using the resource identifier to access the movie. Then, playback commands from the tablet computer can be used to control the playback of the movie on the television.

Having now described an example implementation, a computer with which components of such a system are designed to operate will now be described. The following description is intended to provide a brief, general description of a suitable computer with which such a system can be implemented. The computer can be any of a variety of general purpose or special purpose computing hardware configurations. Examples of well-known computers that may be suitable include, but are not limited to, personal computers, server computers, handheld or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
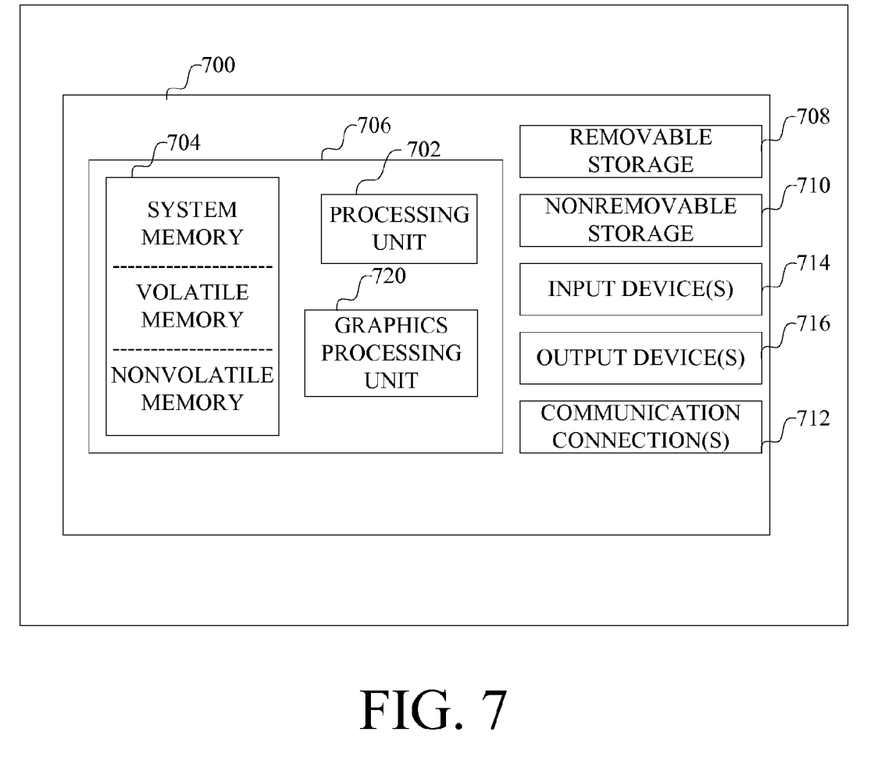
FIG. 7 is a block diagram of an example computer with which components of such a system can be implemented.

FIG. 7 illustrates an example of a suitable computer. This is only one example of a suitable computer and is not intended to suggest any limitation as to the scope of use or functionality of such a computer.

With reference to FIG. 7, an example computer 700, in a basic configuration, includes at least one processing unit 702 and memory 704. The computer may include multiple processing units and/or additional co-processing units such as graphics processing unit 720. Depending on the exact configuration and type of computer, memory 704 may be volatile (such as RAM), non-volatile (such as ROM, flash memory, etc.) or some combination of the two. This configuration is illustrated in FIG. 7 by dashed line 706.

Additionally, computer 700 may also have additional features/functionality. For example, computer 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computer 700. Any such computer storage media may be part of computer 700.

Computer 700 may also contain communications connection(s) 712 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 712 are devices that interface with the communication media to transmit data over and receive data from communication media, such as a network interface.

Computer 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process performed by a processor in a digital media controller, comprising:
   receiving data referencing media data on a remote media server, the data including a resource identifier for a media item,
   receiving protocol information from a digital media renderer, wherein the protocol information includes an identification of an application installed on the digital media renderer;
   determining if the digital media renderer can play the media item based on the resource identifier and the protocol information; and
   presenting the digital media renderer as an available device when it is determined that the digital media renderer can play the media item.

2. The computer-implemented process of claim 1, wherein the step of determining if the digital media renderer can play the media item further comprises determining if the application is capable of playing the media item.

3. The computer-implemented process of claim 2, further comprising determining whether the digital media renderer supports a media type of the media item when it is determined that the application is not capable of playing the media item.

4. The computer-implemented process of claim 1, further comprising presenting a graphical user interface identifying a list of one or more available devices to play the media item.

5. The computer-implemented process of claim 4, further comprising receiving an indication of a selected device available to play the media item, wherein the digital media renderer is the selected device.

6. The computer-implemented process of claim 1, wherein the step of determining if the digital media renderer can play the media item further comprises determining whether the media item is protected.

7. The computer-implemented process of claim 1, further comprising receiving a resource locator for the media item.

8. The computer-implemented process of claim 1 wherein the digital media controller has an application programming interface for sharing information with another device, the process further comprising:
- displaying an indication that the digital media renderer is available to process the media item;
- receiving a selection of the digital media renderer; and
- communicating the resource identifier to the digital media renderer using the application programming interface.

9. A computer-implemented process performed by a processor in a digital media renderer, comprising:
- sending protocol information to a digital media controller, wherein the protocol information includes an identification of an application installed on the digital media renderer;
- receiving, from the digital media controller, a resource identifier for a media item;
- selecting the application to access the media item based on the resource identifier;
- instructing the application to access the media item from a remote media server;
- receiving media data for the media item from the remote media server;
- playing the media data in response to playback commands from the digital media controller.

10. The process performed by the digital media renderer of claim 9, wherein the protocol information further comprises multiple applications installed on the digital media renderer.

11. The process performed by the digital media renderer of claim 9, wherein the digital media renderer has an application programming interface and wherein the process further comprises a request from the digital media controller to provide the protocol information.

12. The process performed by the digital media renderer of claim 9, wherein the digital media renderer has an application programming interface for sharing information with other devices, wherein the process further comprises receiving a command to share the resource identifier from the digital media controller.

13. The article of manufacture of claim 9, further comprising presenting a graphical user interface identifying a list of one or more available devices to play the media item, wherein the list of one or more available devices include the digital media renderer.

14. The article of manufacture of claim 13, further comprising receiving an indication of a selected device available to play the media item, wherein the digital media renderer is the selected device.

15. An article of manufacture comprising a computer storage medium having computer program instructions encoded thereon that, when processed by a computer, instruct the computer to perform a process comprising:
- receiving data referencing media data on a remote media server, the data including a resource identifier for a media item;
- receiving protocol information from a digital media renderer, wherein the protocol information includes an identification of an application installed on the digital media renderer;
- determining if the digital media renderer can play the media item based on the resource identifier and the protocol information; and
- presenting the digital media renderer as an available device when it is determined that the digital media renderer can play the media item.

16. The article of manufacture of claim 15, wherein the step of determining if the digital media renderer can play the media item further comprises determining if the application is capable of playing the media item.

17. The article of manufacture of claim 16, further comprising determining whether the digital media renderer supports a media type of the media item when it is determined that the application is not capable of playing the media item.

18. The article of manufacture of claim 15, wherein the step of determining if the digital media renderer can play the media item further comprises determining if the media item is protected.

19. The article of manufacture of claim 18, further comprising sending a resource locator for the media item to the digital media controller.

20. The article of manufacture of claim 15 wherein the digital media controller has an application programming interface for sharing information with another device, the process further comprising:
- displaying an indication that the digital media renderer is available to process the media item;
- receiving a selection of the digital media renderer; and
- communicating the resource identifier to the digital media renderer using the application programming interface.

* * * * *